United States Patent
Cha et al.

(10) Patent No.: US 11,325,032 B2
(45) Date of Patent: May 10, 2022

(54) VIRTUAL REALITY IMAGE PLAYING DEVICE AND METHOD FOR PLAYING MULTIPLE VIRTUAL REALITY IMAGES BY USING ONE STREAMING IMAGE

(71) Applicant: ALPHACIRCLE CO., LTD., Seongnam-si (KR)

(72) Inventors: Dong Woo Cha, Seongnam-si (KR); Ta sik Chung, Seongnam-si (KR)

(73) Assignee: APLHACIRCLE CO., LTD., Seongnam-si (KR)

( * ) Notice: Subject to any disclaimer, the term of this patent is extended or adjusted under 35 U.S.C. 154(b) by 0 days.

(21) Appl. No.: 17/464,922

(22) Filed: Sep. 2, 2021

(65) Prior Publication Data
US 2021/0394055 A1  Dec. 23, 2021

Related U.S. Application Data

(63) Continuation of application No. PCT/KR2020/017142, filed on Nov. 27, 2020.

(30) Foreign Application Priority Data

Nov. 28, 2019 (KR) .......................... 10-2019-0155779

(51) Int. Cl.
*H04N 13/383* (2018.01)
*A63F 13/355* (2014.01)
(Continued)

(52) U.S. Cl.
CPC .......... *A63F 13/355* (2014.09); *A63F 13/497* (2014.09); *G06F 3/013* (2013.01);
(Continued)

(58) Field of Classification Search
CPC ... G06T 15/405; G06T 3/0087; H04N 13/117; H04N 13/161; H04N 13/239;
(Continued)

(56) References Cited

U.S. PATENT DOCUMENTS

2013/0243103 A1* 9/2013 Sasaki .................... H04N 13/00
                                                         375/240.25
2015/0071362 A1* 3/2015 Uchiumi .............. H04N 19/597
                                                         375/240.26
(Continued)

FOREIGN PATENT DOCUMENTS

KR    1020110119063 A    11/2011
KR    1020170123656 A    11/2017
(Continued)

OTHER PUBLICATIONS

Office Action of KR 10-2019-0155779 dated Nov. 23, 2020.
International Search Report of PCT/KR2020/017142 dated Mar. 5, 2020.

*Primary Examiner* — Lawrence S Galka
(74) *Attorney, Agent, or Firm* — Dinsmore & Shohl LLP; Yongsok Choi, Esq.

(57) ABSTRACT

The present invention provides a virtual reality image playing device, the device comprising: a streaming image input unit for receiving, through streaming, one streaming image including multiple virtual reality images captured in different directions at an identical time and at an identical point; a streaming time operation unit for adding a play position of a currently playing virtual reality image to a reference time of a virtual reality image to be newly played; and an image playing unit for playing a streaming image, which has been streamed, on a display device. When virtual reality images captured in different directions are to be played as a gaze of a user changes, the virtual reality image playing device plays multiple virtual reality images by using one streaming image by performing a streaming time jump of a streaming image, using a reference time at which an individual virtual reality image starts.

6 Claims, 5 Drawing Sheets

(51) Int. Cl.
    *G06F 3/01*          (2006.01)
    *A63F 13/497*     (2014.01)
    *H04N 21/218*     (2011.01)
    *H04N 21/81*      (2011.01)
    *H04N 21/234*     (2011.01)

(52) U.S. Cl.
    CPC . *H04N 21/21805* (2013.01); *H04N 21/23424* (2013.01); *H04N 21/816* (2013.01); *H04N 21/8173* (2013.01); *A63F 2300/634* (2013.01); *A63F 2300/8082* (2013.01)

(58) Field of Classification Search
    CPC .. H04N 13/261; H04N 13/271; H04N 13/275; H04N 13/279; H04N 13/344; H04N 13/351; H04N 2013/0081
    See application file for complete search history.

(56) References Cited

U.S. PATENT DOCUMENTS

| | | | |
|---|---|---|---|
| 2017/0084073 A1* | 3/2017 | Pio | G06T 15/20 |
| 2017/0352191 A1 | 12/2017 | Zhou | |
| 2018/0020204 A1* | 1/2018 | Pang | H04N 13/156 |
| 2018/0232955 A1* | 8/2018 | Namgoong | H04N 21/6587 |
| 2019/0174114 A1* | 6/2019 | Mun | H04N 13/172 |
| 2019/0174125 A1* | 6/2019 | Ninan | H04N 13/139 |

FOREIGN PATENT DOCUMENTS

| | | |
|---|---|---|
| KR | 1020180038256 A | 4/2018 |
| KR | 1020190065838 A | 6/2019 |

\* cited by examiner

VIRTUAL REALITY IMAGE PLAYING DEVICE AND METHOD FOR PLAYING MULTIPLE VIRTUAL REALITY IMAGES BY USING ONE STREAMING IMAGE

CROSS-REFERENCE TO RELATED APPLICATIONS

This application is a continuation of International Patent Application No. PCT/KR2020/017142 filed on Nov. 27, 2020 which claims priority to and the benefit of Korean Patent Application No. 10-2019-0155779 filed in the Korean Intellectual Property Office on Nov. 28, 2019, the entire contents of which are incorporated herein by reference.

TECHNICAL FIELD

The present disclosure relates to a virtual reality image playback device and a virtual reality image playback method.

BACKGROUND

In a virtual reality image technology of the related art, in order to stitch an original image covering all directions of 360-degree, a plurality of virtual reality images are taken by using a plurality of cameras.

The plurality of virtual reality images are obtained by imaging different regions at the same time. Therefore, when a user's gaze moves to another region and a virtual reality image currently played back can no longer cover a corresponding region, a new virtual reality image has to be played back instead of the previously played virtual reality image.

However, the related art has a problem in that a load on a server increases because a plurality of virtual reality images first has to be stored in the server and a virtual reality image corresponding to a user's gaze has to be newly transmitted according to a change in a user's gaze.

In addition, it is not easy to synchronize between files being changed and streamed, and there is a delay in the virtual reality playback device.

Accordingly, the inventor of the present disclosure proposes the present disclosure after a long period of research and trial and error in order to solve such a problem.

SUMMARY OF INVENTION

Technical Problem

In the present disclosure, a plurality of virtual reality images are streamed from a single streaming image in order to solve the problem.

In the present disclosure, by combining a plurality of virtual reality images into a single streaming image, a change in space is replaced with a change in time. That is, a problem of changing a streamed file according to a change in space is to be solved by using a change in time within one file.

Meanwhile, the plurality of virtual reality images include a wide area image generated by stitching all or part of an original image, and a patch image generated by stitching a narrower region than the wide area image. Accordingly, when a user views a region corresponding to the patch image, the user views a high-quality image.

In addition, the plurality of virtual reality images include a plurality of divided images obtained by dividing the original image into N pieces. The plurality of divided images may not overlap each other or may intentionally overlap a certain region.

Assuming that resolutions are the same, image quality of a partially stitched image is higher than image quality of the entire stitched image of the original image. Accordingly, the divided images are more advantageous for generating a high-quality image.

The present disclosure may further include asynchronous playback content in addition to the synchronized wide area image, a patch image, and divided images. Hereinafter, this is referred to as asynchronous content. A producer who generates a virtual reality image may implement more diverse representing methods by representing asynchronous content on any one of the plurality of virtual reality images.

Meanwhile, other objects not specified in the present disclosure will be further considered within a range that may be easily inferred from the following detailed description and effects thereof.

Solution to Problem

According to a first aspect of the present disclosure, a virtual reality image playback device for playing back a plurality of virtual reality images from a single streaming image, include a streaming image input unit configured to receive a streaming image including a plurality of virtual reality images taken at the same point in different directions at the same time;

a streaming time calculation unit that, when a virtual reality image to be played back is changed according to a change in a user's gaze during streaming, synchronizes a virtual reality image to be newly played back by adding a play position of a virtual reality image currently played back to a reference time of the virtual reality image to be newly played back; and an image playback unit configured to play the streamed streaming image on a display device, wherein the plurality of virtual reality images are files stitched from one original image generated to implement virtual reality, the streaming image is a single file in which the plurality of virtual reality images are arranged in different time zones based on a reference time allocated to each of the plurality of virtual reality images, and the virtual reality image playback device plays back the plurality of virtual reality images from the single streaming image by using a method of jumping a streaming time of the streaming image in which a change in space is replaced with a change in time by using a reference time at which individual virtual reality images starts, when the plurality of virtual reality images taken in different directions has to be played back according to a change in a user's gaze.

According to a second aspect of the present disclosure, a virtual reality image playback device for playing back a plurality of virtual reality images from a single streaming image, includes a streaming image input unit configured to receive a streaming image including a plurality of virtual reality images taken in different directions at the same time;

a streaming time calculation unit that, when a virtual reality image to be played back is changed according to a change in a user's gaze during streaming, synchronizes a virtual reality image to be newly played back; and an image playback unit configured to play the streamed streaming image on a display device, wherein the streaming image is a single file in which the plurality of virtual reality images are arranged in different time zones based on a reference time allocated to each of the plurality of virtual reality images, and the streaming time calculation unit synchronizes a first virtual reality image and a second virtual reality image included in a streaming image in which a change in space is replaced with a change in time in a following way when selectively playing back according to the user's gaze, 1) when the first virtual reality image has to be played back, jumping is made to a streaming time at which a play position of the virtual reality image currently played back is added to a first reference time when the first virtual reality image starts, and 2) when the second virtual reality image has to be played back, jumping is made to the streaming time at which the play position of the virtual reality image currently played back is added to a second reference time when the second virtual reality image starts.

According to a third aspect of the present disclosure, a virtual reality image playback method of playing back a plurality of virtual reality images from a single streaming image by using a virtual reality image playback device receiving the single streaming image including the plurality of virtual reality images, includes (a) receiving a single streaming image including the plurality of virtual reality images taken in different directions at the same time and obtained by replacing a change in space with a change in time;

(b) playing back a virtual reality image corresponding to a current user's gaze and checking a play position of the virtual reality image currently played back; and (c) synchronizing a virtual reality image to be newly played back by adding the play position of the virtual reality image currently played back to a reference time of the virtual reality image to be newly played back when the virtual reality image to be played back is changed according to a change in the user's gaze during streaming.

According to a fourth aspect of the present disclosure, a virtual reality image providing server for playing back a plurality of virtual reality images from a single streaming image, includes an image input unit configured to receive a file stitched from one original image generated to implement virtual reality and to receive the plurality of virtual reality images taken in different directions at the same time of the original image;

a streaming image generating unit configured to allocate a separate reference time to each individual virtual reality image and to generate the plurality of received virtual reality images as a single streaming image file in which a change in space is replaced with a change in time without generating a separate file such that the plurality of virtual reality images are arranged in different time zones based on the reference time; and a streaming providing unit configured to stream the generated single streaming image to a virtual reality image playback device, wherein the streaming providing unit provides the streaming image by using a method of jumping a reference time within the single streaming image even when a virtual reality image to be played back is changed due to a change in a user's gaze.

In a preferred embodiment, the image playback unit may include a wide area image playback unit configured to play back a wide area image included in the plurality of virtual reality images, and a patch image playback unit configured to generate a patch image by overlapping the patch image included in the plurality of virtual reality images on the wide area image, and the patch image may be an image that represents part of the wide area image with different image quality.

In a preferred embodiment, the image playback unit may include a plurality of divided image playback units configured to play back divided images included in the plurality of virtual reality images to overlap each other, and the divided images may be obtained by dividing one original image into N regions that overlap each other.

Advantageous Effects

The present disclosure has an effect of streaming a plurality of virtual reality images from a single streaming image. Because a virtual reality image corresponding to all regions, spaces, and angels of view may be played back by a single streaming image, and there is an effect that a load on a server is reduced and no effort is needed to perform synchronization when playing back a plurality of virtual reality image files.

That is, the present disclosure combines a plurality of virtual reality images into a single streaming image and responds by changing only a streaming time within one file rather than changing and playing a file even when the user's gaze changes. As described above, the present disclosure has an effect of solving technical disadvantages of the related art by providing a technique for replacing a change in pace with a change in time.

Meanwhile, the present disclosure may play back the synchronized patch image on a wide area image. A producer may select a necessary portion of an original image to generate the portion as a patch image, and the patch image may be generated in higher quality than quality of the wide area image. Therefore, there is an effect that only partial region may be generated as a high-quality patch image, when generating virtual reality content in which a gaze mainly stays on the front portion such as a performance or a lecture.

In addition, the present disclosure may generate divided images obtained by dividing an original image into N pieces. The N divided images may have different image qualities. Therefore, even in this case, there is an effect that only a partial region may be generated as a high-quality divided image when generating virtual reality content in which a gaze mainly stays on the front portion such as a performance or a lecture.

In addition, the present disclosure may further include asynchronous playback content in addition to the synchronized a wide area image, a patch image, and divided images. A producer who generates a virtual reality image may implement more diverse representing methods by representing asynchronous content on any one of a plurality of virtual reality images. For example, when a user's gaze faces a region where the asynchronous content is arranged, separate asynchronous content independent of the plurality of virtual reality images currently played back is activated. The asynchronous content may be not only an image but also various contents such as a certain operation and an event pop-up.

Meanwhile, even when there is an effect not explicitly described herein, effects that are expected by the technical features of the present disclosure and are described in the following specification, and potential effects thereof are treated as described in the specification of the present disclosure.

It is revealed that the accompanying drawings are exemplified as a reference for understanding the technical idea of the present disclosure, and the scope of the present disclosure is not limited thereby.

DETAILED DESCRIPTIONS

In describing the present disclosure, when it is determined that a related known function is obvious to those skilled in the art and may unnecessarily obscure the gist of the present disclosure, detailed descriptions thereof are omitted.

In the present disclosure, a plurality of virtual reality images are images stitched from an original image, and include a wide area image, a patch image, and a divided image.

Figure 1A:
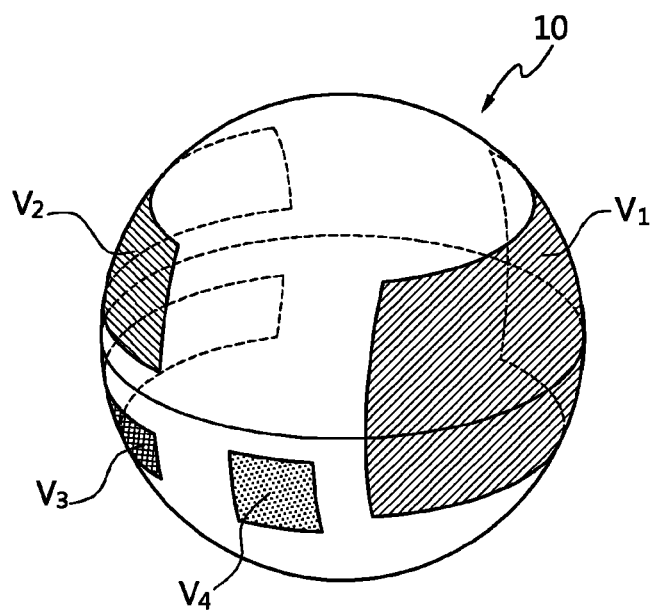
FIGS. 1A and 1B are views illustrating concepts of a wide area image, a patch image, and a plurality of divided images according to the present disclosure.
Figure 1B:
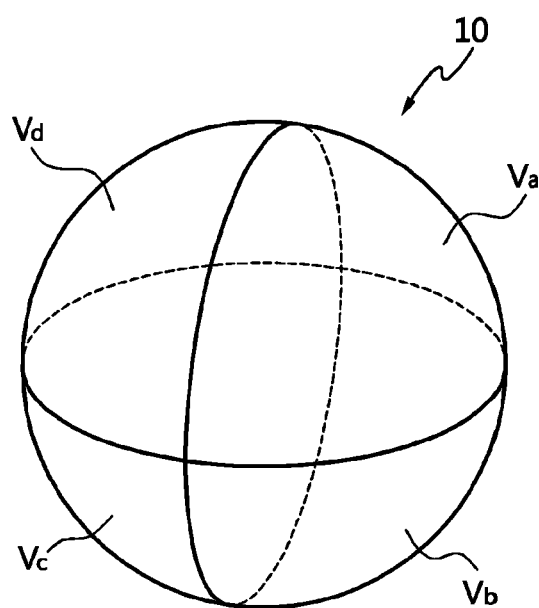

FIGS. 1A and 1B are views illustrating concepts of a wide area image, a patch image, and a plurality of divided images according to the present disclosure.

The concepts of the wide area image and the patch image according to the present disclosure will be described with reference to FIG. 1A. Assuming that the entire virtual reality region 10 of 360 degrees is represented as a sphere, a wide area image $V_0$ is an image representing the entire virtual reality region 10 of 360 degrees or a wider region than the patch image. Hereinafter, for the sake of convenience, a wide-region image will be described as covering the entire virtual reality region but is not limited thereto. The wide-region image $V_0$ is played back all the time.

The patch images $V_1$ to $V_3$ represent part of the virtual reality region 10 of 360 degrees. The patch images $V_1$ to $V_3$ may have different coverage regions, different areas, and different image quality. For example, the first patch image $V_1$ may be a high-quality image that covers part of upper and lower portion of a front portion. When virtual reality content is a musical, the first patch image $V_1$ may be a region covering a stage of the musical. The second patch image $V_2$ may be an image covering part of an upper portion of a rear portion, and the third patch image $V_3$ may be an image covering part of a lower portion of the rear portion.

The patch images $V_1$ to $V_3$ are played back by being overlapped or patched on the wide area image $V_0$. Therefore, even when any one of the patch images $V_1$ to $V_3$ to be played back is turned off as necessary, the wide area image $V_0$ is played back later, and thus, a blank does not occur in the image.

The patch images $V_1$ to $V_3$ are played back in synchronization with the wide area image $V_0$. This is because the patch images $V_1$ to $V_3$ may cause dizziness to a user when synchronization of the wide area image $V_0$ is not implemented.

An asynchronous content $V_4$ refers to content randomly inserted by intention of a creator regardless of a plurality of virtual reality images. The asynchronous content $V_4$ may also be a video or a specific event action. In terms of content, the asynchronous content may also be an advertisement or may be an event related to a virtual reality image.

The asynchronous content $V_4$ is not synchronized with a plurality of virtual reality images. That is, the asynchronous content $V_4$ is played back or operated by separate trigger information regardless of synchronization between the patch images $V_1$ to $V_3$ and the wide area image $V_0$. In a preferred embodiment, the trigger information includes information on whether or not a user's gaze faces a position of the asynchronous content $V_4$.

Concept of divided images $V_1$ to $V_N$ according to the present disclosure will be described with reference to FIG. 1B (N is a natural number greater than 1).

In one embodiment, the divided images $V_1$ to $V_N$ may be obtained by dividing one original image into N regions that are not superimposed on each other. A plurality of divided images $V_1$ to $V_N$ may have different sizes and may have different image quality.

The plurality of divided images $V_1$ to $V_N$ are played back in synchronization with each other. Some of the plurality of divided images $V_1$ to $V_N$ may be turned off as necessary. Although not illustrated, the asynchronous content $V_4$ may be displayed in a certain region of the divided images $V_1$ to $V_N$.

Figure 2:
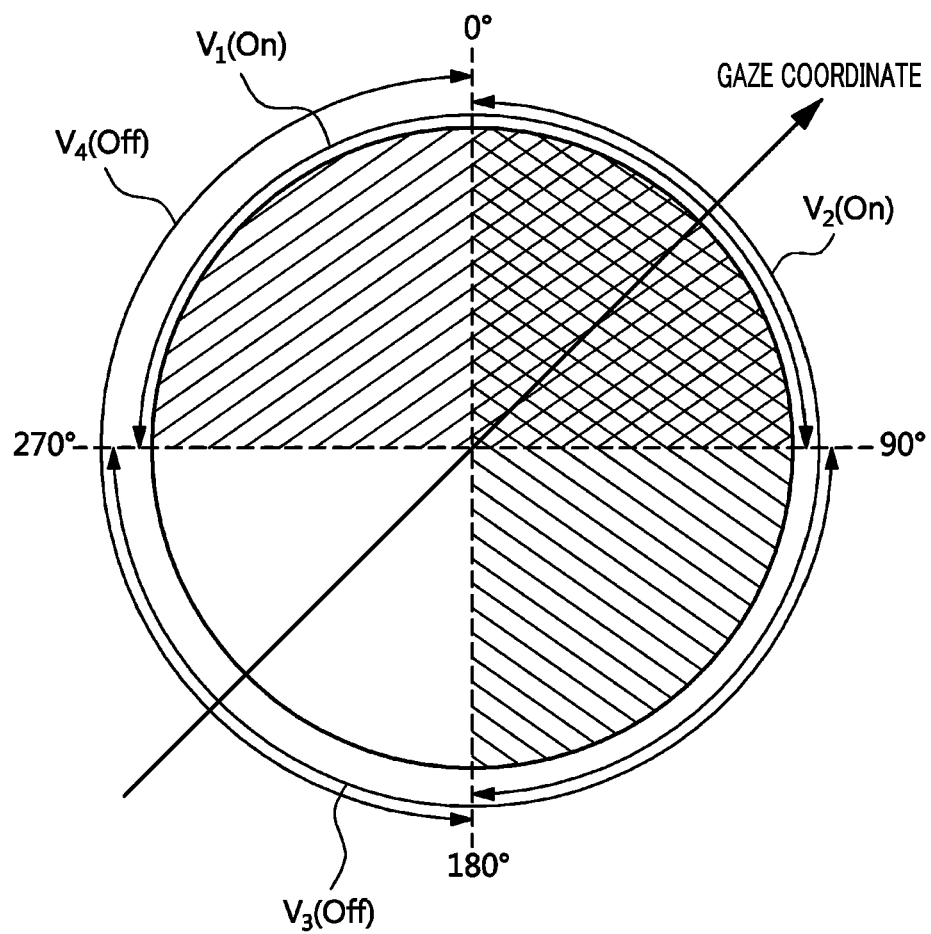
FIG. 2 is a view illustrating another embodiment of the divided images according to the present disclosure.

FIG. 2 is a view illustrating another embodiment of the divided images according to the present disclosure.

In another embodiment, the divided images $V_1$ to $V_N$ may be superimposed on each other by a certain region. The plurality of divided images $V_1$ to $V_N$ are played back in synchronization with each other. In this case, the superimposed divided images are played back while overlapping each other. Some of the plurality of divided images $V_1$ to $V_N$ may be turned off as necessary.

For example, four divided images covering 180 degrees may be superimposed on each other by 90 degrees ($V_1$ is 270 degrees to 90 degrees, $V_2$ is 0 degree to 180 degrees, $V_3$ is 90 degrees to 270 degrees, and $V_4$ is 180 degrees to 360 degrees). When a gaze coordinate is 45 degrees, any one of $V_1$ and $V_2$ may be turned on and $V_3$ and $V_4$ may be turned off.

When the divided images are superimposed on each other in this way, the number of divided images to be played back may be reduced. Naturally, the number of divided images to be synchronized is also reduced. Accordingly, burden on the system is reduced.

In addition, there is an advantage in that, when the divided images are superimposed on each other, it is not necessary to tightly control on/off operations of the divided images according to a user's gaze among the divided images when the user's gaze changes rapidly. For example, even when $V_1$ is turned off, $V_2$ covers a region between 0 degree and 90 degrees, which are part of the region covered by $V_1$, and thus, even when the on/off operations of the divided images are delayed, a possibility that a blank (a failure situation where nothing is displayed in the user's gaze) occurs is reduced. Meanwhile, an embodiment of the wide area image and the patch image may be mixed with an embodiment of the divided images. For example, the patch image may be played back in part of a plurality of divided images. In this case, a divided image overlapping the patch image will be understood as a wide area image.

Figure 3:
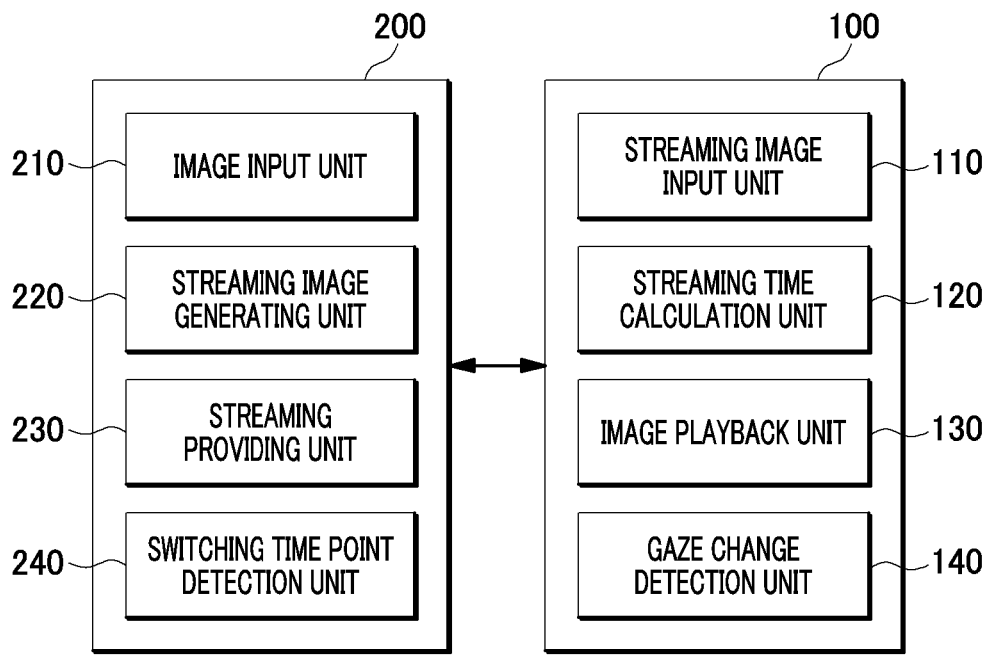
FIG. 3 is a diagram illustrating a preferred embodiment of a virtual reality image playback system according to the present disclosure.

FIG. 3 is a diagram illustrating a preferred embodiment of the virtual reality image playback system according to the present disclosure.

As can be seen from FIG. 3, the virtual reality image playback system according to the present disclosure includes a virtual reality image playback device 100 and a virtual reality image providing server 200.

The virtual reality image playback device 100 according to the present disclosure receives a streaming image from the virtual reality image providing server 200 to play back a virtual reality image for a user. In a preferred embodiment, the virtual reality image playback device 100 may be a smart terminal including a smartphone or may be a wearable device worn on a user's head but is not limited thereto.

In the present disclosure, a plurality of virtual reality images are files stitched from one original image generated to implement virtual reality. The streaming image is a single file in which a plurality of virtual reality images are arranged in different time zones based on a reference time allocated to each virtual reality image.

In the present disclosure, the reference time indicates a reference point at which a specific virtual reality image starts within a single streaming image. A play position refers to how far the virtual reality image currently played back is played. For example, there is a 10-minute virtual reality image, and when 3 minutes and 31 seconds are currently streaming, the play position is 3 minutes and 31 seconds.

In the present disclosure, the reference time and the play position (or play time) are used to describe a specific position in an image file. Therefore, in this concept, the above-described terms may be replaced with terms such as a reference frame and a play frame. That is, it is okay to treat time as a frame.

The virtual reality image playback device 100 according to the present disclosure may adopt a method of jumping a streaming time of a streaming image by using the reference time at which an individual virtual reality image starts, when a virtual reality image taken in a different direction has to be played back according to a change in a user's gaze. Accordingly, even when a single streaming image is streamed, a plurality of virtual reality images may be sufficiently played back.

This will be described in more detail as follows. In a preferred embodiment, the virtual reality image playback device 100 may include a streaming image input unit 110, a streaming time calculation unit 120, an image playback unit 130, and a gaze change detection unit 140.

The streaming image input unit 110 receives a single streaming image.

In the related art, when streaming a plurality of virtual reality images obtained by imaging different directions, a server stores a plurality of virtual reality images to stream a new virtual reality image file each time the user's gaze is changed, and thus, there was a great burden. In addition, there was a problem in that a delay occurred in the virtual reality playback device while the file was changed to be streamed.

However, the streaming image input unit 110 according to the present disclosure receives a single streaming image including a plurality of virtual reality images taken in different directions at the same point and at the same time, and thus, the above-described problem is solved. That is, by consecutively attaching a plurality of virtual reality images in different time zones within a single streaming image, even when reaching a situation where another virtual reality image has to be played back, it is possible to respond only by jumping a playback time of the streaming image without hassle of changing a file being streamed.

The streaming time calculation unit 120 synchronizes a virtual reality image to be newly played back when the virtual reality image to be played back is changed according to a change in a user's gaze during streaming. In a preferred embodiment, the streaming time calculation unit 120 synchronizes the virtual reality image to be newly played back by adding a play position of the virtual reality image currently played back at the reference time of the virtual reality image to be newly played back when the virtual reality image to be played back is changed according to the change in a user's gaze during streaming.

This will be described in more detail as follows. The streaming time calculation unit 120 may synchronize a first virtual reality image and a second virtual reality image included in the streaming image in the following way when selectively playing back according to the user's gaze.

1) When the first virtual reality image has to be played back, jumping is made to a streaming time at which a play position of the virtual reality image currently played back is added to the first reference time when the first virtual reality image starts.

2) When the second virtual reality image has to be played back, jumping is made to a streaming time at which a play position of the virtual reality image currently played back is added to a second reference time when the second virtual reality image starts.

However, in another embodiment of the present disclosure, the streaming time calculation unit may be excluded from the virtual reality image playback device. That is, the virtual reality image playback device does not calculate a streaming time to be directly jumped, and a virtual reality image providing server may calculate the streaming time to be directly jumped.

The image playback unit 130 plays back the streamed streaming image on a display device.

The gaze change detection unit 140 tracks a gaze direction of a user. To this end, the gaze change detection unit 140 may include an acceleration sensor, a tilt sensor, and so on.

The gaze change detection unit 140 may detect a gaze direction of a user to determine whether or not to change a virtual reality image which is played back. When the user's gaze is outside a space (or angle of view) of the virtual reality image currently played back, the gaze change detection unit 140 provides the virtual reality image to the streaming time calculation unit such that the streaming time calculation unit jumps the streaming time.

Meanwhile, in another embodiment, the gaze change detection unit 140 may track the gaze direction of the user and transmit a tracking result to the virtual reality image providing server. In this embodiment, the streaming time to be jumped is calculated by the virtual reality image providing server.

In addition, the virtual reality image playback device 100 according to the present disclosure may further include a configuration such as a communication unit for receiving a streaming image.

The virtual reality image providing server 200 generates a single streaming image by combining a plurality of virtual reality images and streams the streaming image to a virtual reality image playback device. In another embodiment, a server for generating a streaming image may be physically different from a server for streaming an actual streaming image.

The virtual reality image providing server 200 may include an image input unit 210, a streaming image generating unit 220, a streaming providing unit 230, and a switching time point detection unit 240.

The image input unit 210 receives a plurality of virtual reality images which are stitched files from one original image generated to implement virtual reality and are obtained by imaging different directions at the same time of the original image.

The streaming image generating unit 220 allocates a separate reference time to each individual virtual reality image and generates a single streaming image file without generating a plurality of virtual reality images which are input as a separate file such that the plurality of virtual reality images are arranged in different time zones based on a reference time. One generated streaming image may include information on the reference time.

Although not illustrated, the streaming image generating unit 220 may include a running time analysis unit that analyzes a running time when playing back a plurality of virtual reality images, a reference time allocation unit that generates a reference time not less than the running time and allocates the reference time to each of the plurality of virtual reality images, and a reference time storage unit that stores information about a reference time matched to the plurality of virtual reality images.

The streaming providing unit 230 streams the generated a single streaming image to the virtual reality image playback device. When generating a streaming image, the reference time allocated to the plurality of virtual reality images may be provided to the virtual reality image playback device together with the streaming image. The streaming providing unit 230 provides the streaming image by jumping the reference time in a single streaming image even when the user's gaze changes and a virtual reality image to be played back is changed.

The switching time point detection unit 240 is configured to calculate a streaming time when the virtual reality image playback device does not directly calculate a streaming time to be jumped. When the virtual reality image to be played back is changed as the user's gaze changes during streaming, the switching time point detection unit 240 synchronizes a virtual reality image to be newly played back. In a preferred embodiment, when the virtual reality image to be played back is changed as the user's gaze changes during streaming, the switching time point detection unit 240 synchronizes a virtual reality image to be newly played back by adding a play position of the virtual reality image currently played back to a reference time of the virtual reality image to be newly played back.

Figure 4:
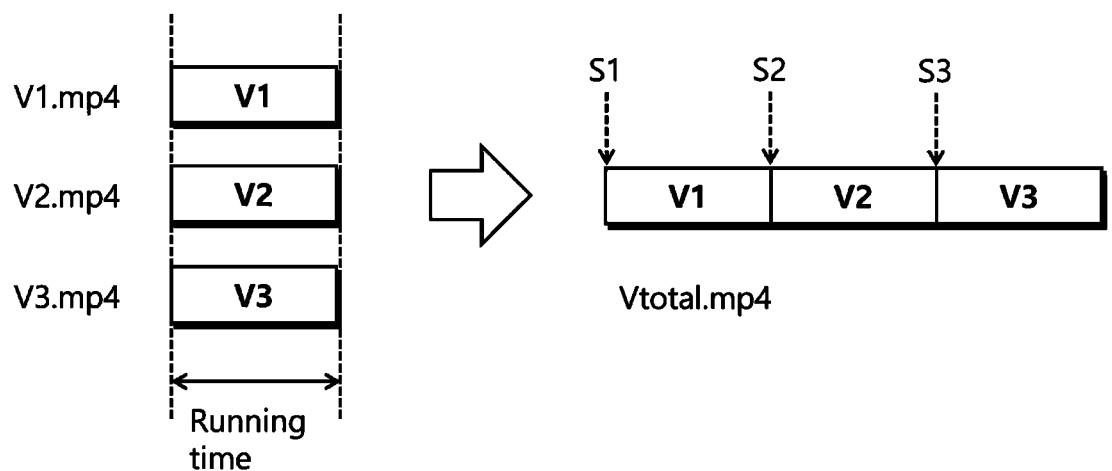
FIG. 4 is a diagram illustrating a preferred embodiment of a structure of a streaming image according to the present disclosure.

FIG. 4 is a diagram illustrating a preferred embodiment of a structure of a streaming image according to the present disclosure.

As can be seen from FIG. 4, a plurality of virtual reality images V1, V2, and V3 are generated as different files such as V1.mp4, V2.mp4, and V3.mp4, respectively. In the present disclosure, the plurality of virtual reality images are combined into a single streaming image based on reference times S1, S2, and S3.

To this end, the running time analysis unit analyzes a running time when individual virtual reality images are played back. Because the plurality of virtual reality images are generated from a single original image, the running time of individual virtual reality images may be the same in most cases. In the embodiment of FIG. 4, it is assumed that the running times of the plurality of virtual reality images V1, V2, and V3 are each 10 minutes.

The reference time allocation unit generates a reference time not less than the running time and allocates the reference time to each of the plurality of virtual reality images.

In a preferred embodiment, a reference time of an $m^{th}$ virtual reality image of N virtual reality images may be calculated by the following equation.

STANDARD TIME$_m$=RUNNING TIME×$(m-1)$

For example, the reference time S1 of V1 may be 0, the reference time of V2 may be 10 minutes, and the reference time of V3 may be 20 minutes.

The reference time storage unit stores information on the reference times matched to the plurality of virtual reality images.

Figure 5:
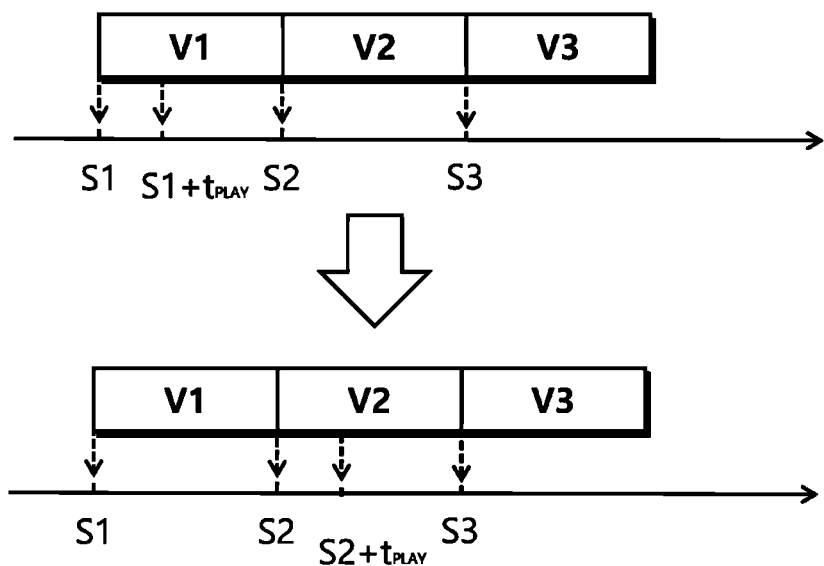
FIG. 5 is a diagram illustrating a preferred embodiment of jumping of a streaming time in a streaming image according to the present disclosure.

FIG. 5 is a diagram illustrating a preferred embodiment of jumping of a streaming time in a streaming image according to the present disclosure.

As can be seen from FIG. 5, a single streaming image (Vtotal.mp4) is streamed to a virtual reality image playback device. It is assumed that a virtual reality image currently played back is V1, and a play position $t_{play}$ is 3 minutes and 30 seconds.

When it is determined that the virtual reality image V2 has to be played back because a user's gaze is changed, jumping is made to a streaming time at which the play position $t_{play}$ is added to the reference time of the virtual reality image V2. That is, 13 minutes and 30 seconds obtained by adding 3 minutes and 30 seconds which is the play position $t_{play}$, to the reference time of 10 minutes of the virtual reality image V2 is the streaming time to be jumped.

The present disclosure solves the problems of the related art by changing time played back in one streaming file rather than changing the file to be streamed as described above. In brief, the present disclosure solves the problems of the related art by replacing movement of a space with movement of time.

Figure 6:
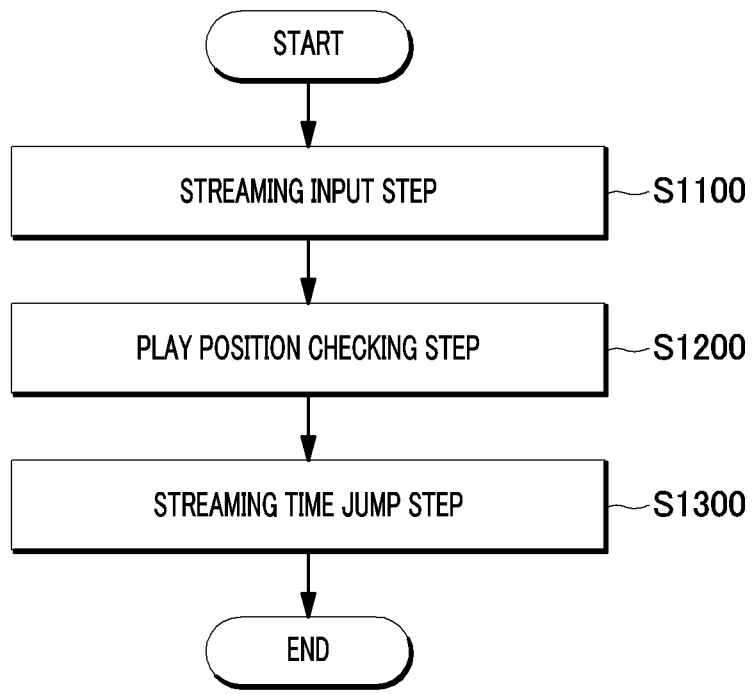
FIG. 6 is a flowchart illustrating a preferred embodiment of a virtual reality image playback method according to the present disclosure.

FIG. 6 is a flowchart illustrating a preferred embodiment of a virtual reality image playback method according to the present disclosure.

In the virtual reality image playback method according to the present disclosure, a plurality of virtual reality images are files stitched from one original image generated to implement virtual reality. The streaming image is a single file in which a plurality of virtual reality images are arranged in different time zones based on a reference time allocated to each virtual reality image. The reference time refers to a reference point at which a specific virtual reality image starts within a single streaming image. The play position refers to how far the virtual reality image currently played back is played. For example, there is a 10-minute virtual reality image, and when streaming is made for 3 minutes and 31 seconds, the play position may be 3 minutes and 31 seconds. In the present disclosure, the reference time and the play position (or play time) are used to describe a specific position in an image file. Therefore, in this concept, the reference time and the play position may be replaced respectively with a reference frame and a play frame. That is, it is okay to treat time as a frame.

In the virtual reality image playback method according to the present disclosure, when a virtual reality image taken in a different direction has to be played back according to a change in a user's gaze, a method of jumping a streaming time of a streaming image by using a streaming time including a reference time and a play position at which the individual virtual reality image starts is adopted, and thus, even when receiving a single streaming image, a plurality of virtual reality images may be played back.

As can be seen from FIG. 6, a virtual reality image playback device that receives a single streaming image including a plurality of virtual reality images performs the following virtual reality image playback method.

A single streaming image including a plurality of virtual reality images taken in different directions at the same point and at the same time is received (S1100).

A virtual reality image corresponding to a current user's gaze is played, and a play position of the virtual reality image currently played back is checked (S1200).

When the virtual reality image to be played back is changed according to a change in a user's gaze during streaming, a virtual reality image to be played back is newly synchronized by adding a play position of a virtual reality image currently played back to the reference time of the virtual reality image to be newly played back (S1300).

What is claimed is:

1. A virtual reality image playback device for playing back a plurality of virtual reality images from a single streaming image, the device comprising:
    a streaming image input unit configured to receive a streaming image including a plurality of virtual reality images taken at the same point in different directions at the same time;
    a streaming time calculation unit that, when a virtual reality image to be played back is changed according to a change in a user's gaze during streaming, synchronizes a virtual reality image to be newly played back by adding a play position of a virtual reality image currently played back to a reference time of the virtual reality image to be newly played back; and
    an image playback unit configured to play the streamed streaming image on a display device,
    wherein the plurality of virtual reality images are files stitched from one original image generated to implement virtual reality,
    the streaming image is a single file in which the plurality of virtual reality images are arranged in different time zones based on a reference time allocated to each of the plurality of virtual reality images, and
    the virtual reality image playback device plays back the plurality of virtual reality images from the single streaming image by using a method of jumping a streaming time of the streaming image in which a change in space is replaced with a change in time by using a reference time at which individual virtual reality images starts, when the plurality of virtual reality images taken in different directions has to be played back according to a change in a user's gaze.

2. A virtual reality image playback device for playing back a plurality of virtual reality images from a single streaming image, the device comprising:
    a streaming image input unit configured to receive a streaming image including a plurality of virtual reality images taken in different directions at the same time;
    a streaming time calculation unit that, when a virtual reality image to be played back is changed according to a change in a user's gaze during streaming, synchronizes a virtual reality image to be newly played back; and
    an image playback unit configured to play the streamed streaming image on a display device,
    wherein the streaming image is a single file in which the plurality of virtual reality images are arranged in different time zones based on a reference time allocated to each of the plurality of virtual reality images, and
    the streaming time calculation unit synchronizes a first virtual reality image and a second virtual reality image included in a streaming image in which a change in space is replaced with a change in time in a following way when selectively playing back according to the user's gaze,
    1) when the first virtual reality image has to be played back, jumping is made to a streaming time at which a play position of the virtual reality image currently played back is added to a first reference time when the first virtual reality image starts, and
    2) when the second virtual reality image has to be played back, jumping is made to the streaming time at which the play position of the virtual reality image currently played back is added to a second reference time when the second virtual reality image starts.

3. A virtual reality image playback method of playing back a plurality of virtual reality images from a single streaming image by using a virtual reality image playback device receiving the single streaming image including the plurality of virtual reality images, the method comprising:
    (a) receiving a single streaming image including the plurality of virtual reality images taken in different directions at the same time and obtained by replacing a change in space with a change in time;
    (b) playing back a virtual reality image corresponding to a current user's gaze and checking a play position of the virtual reality image currently played back; and
    (c) synchronizing a virtual reality image to be newly played back by adding the play position of the virtual reality image currently played back to a reference time of the virtual reality image to be newly played back when the virtual reality image to be played back is changed according to a change in the user's gaze during streaming.

4. A virtual reality image providing server for playing back a plurality of virtual reality images from a single streaming image, the server comprising:
    an image input unit configured to receive a file stitched from one original image generated to implement virtual reality and to receive the plurality of virtual reality images taken in different directions at the same time of the original image;
    a streaming image generating unit configured to allocate a separate reference time to each individual virtual reality image and to generate the plurality of received virtual reality images as a single streaming image file in which a change in space is replaced with a change in time without generating a separate file such that the plurality of virtual reality images are arranged in different time zones based on the reference time; and
    a streaming providing unit configured to stream the generated single streaming image to a virtual reality image playback device,
    wherein the streaming providing unit provides the streaming image by using a method of jumping a reference time within the single streaming image even when a virtual reality image to be played back is changed due to a change in a user's gaze.

5. The virtual reality image playback device of claim 1, wherein
    the image playback unit includes a wide area image playback unit configured to play back a wide area image included in the plurality of virtual reality images, and a patch image playback unit configured to generate a patch image by overlapping the patch image included in the plurality of virtual reality images on the wide area image, and the patch image is an image that represents part of the wide area image with different image quality.

6. The virtual reality image playback device of claim 1, wherein the image playback unit includes a plurality of divided image playback units configured to play back divided images included in the plurality of virtual reality images to overlap each other, and the divided images are obtained by dividing one original image into N regions that overlap each other.

* * * * *